F. MOLL.
APPARATUS FOR IMPREGNATING WOOD, &c.
APPLICATION FILED JULY 23, 1913.
1,122,407.
Patented Dec. 29, 1914.
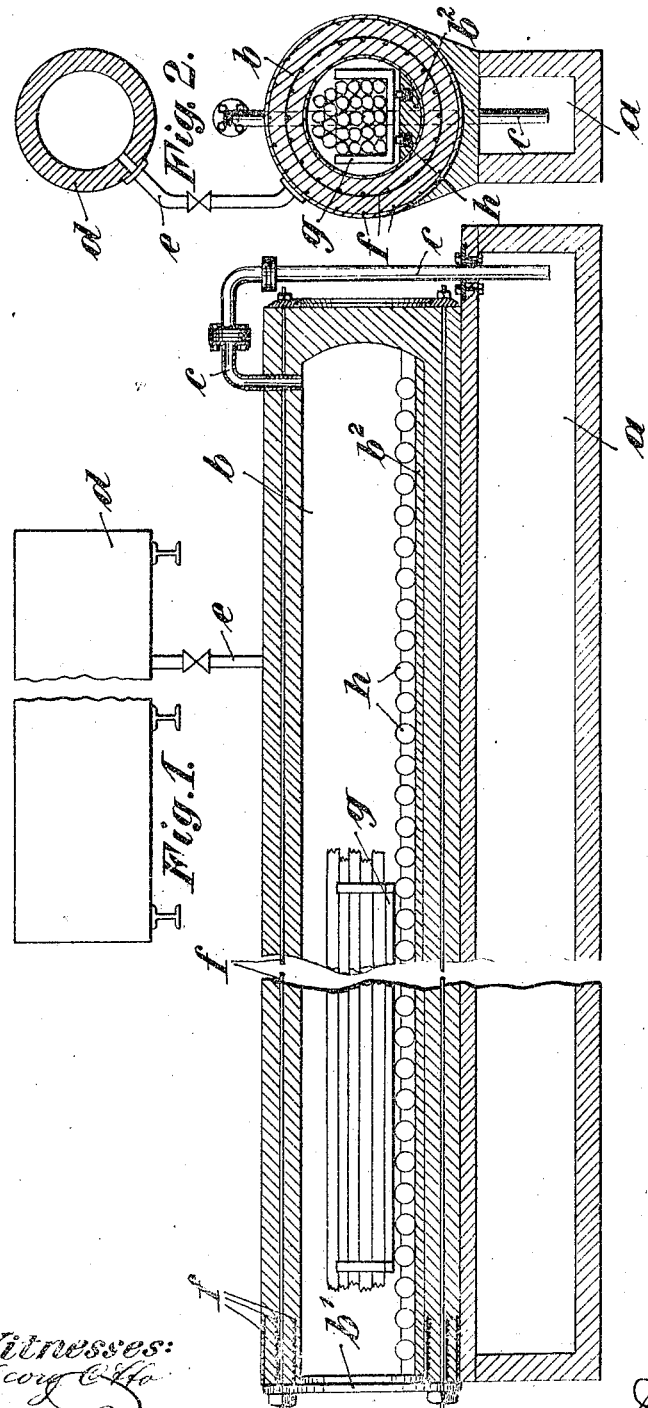

UNITED STATES PATENT OFFICE.

FRIEDRICH MOLL, OF BERLIN-SÜDENDE, GERMANY.

APPARATUS FOR IMPREGNATING WOOD, &c.

1,122,407.

Specification of Letters Patent.   Patented Dec. 29, 1914.

Application filed July 23, 1913. Serial No. 780,702.

*To all whom it may concern:*

Be it known that I, FRIEDRICH MOLL, a subject of the German Emperor, and resident of Brandenburgischestrasse 24, Berlin-Südende, Germany, have invented certain new and useful Improvements in Apparatus for Impregnating Wood, &c., of which the following is a specification.

My invention relates to an apparatus for impregnating wood and other porous materials under pressure with metallic salts which will corrode metallic vessels.

Of the commonly adopted substances for impregnating wood and so forth, the most effective is chlorid of mercury (sublimate). According to the process given out by Kyan in 1832, the materials or objects for impregnation are immersed in solutions of the salt contained in basins of wood or cement. Impregnation under pressure would be much more effective as the salt would then be caused to penetrate throughout the whole alburnum or sapwood which the various previous attempts have failed to carry out. In 1834 Dr. Birkbeck of London and later a Hollandish firm have tried the Kyan process in iron cylinders lined with such substances as tar, asphalt, lead. The linings which were to serve in preventing the direct contact of the solution of sumblimate with the iron parts of the high-pressure vessels were so expensive to make that a commercial working of the process was not possible. Moreover, the vessels, even those provided by Kyan, became soon corroded notwithstanding their linings.

The object of this invention is to provide a suitable construction of vessels for the aforesaid purpose from materials which are not liable to corrosion by the sublimate. The materials suitable for this purpose are chiefly concrete and wood.

The apparatus according to the present invention is shown in the accompanying drawing by way of example.

Figure 1 is a longitudinal section through the apparatus, and Fig. 2 a cross section.

$a$ is the tank containing the impregnating solution; upon this tank is situated the impregnating vessel $b$ which is connected with the tank $a$ by means of pipes $c$, and is closed by a removable cover $b^1$.

$d$ is the measuring vessel, which is connected to the impregnating vessel $b$ by means of a pipe $e$. If cylindrical vessels are used, they may be rendered stronger by means of iron hoops or plates, and when the vessels are made of concrete, they may be suitably reinforced, as shown at $f$ in the drawing. These vessels can also be used for impregnating materials with other metallic salts which cannot be used in iron vessels, such as copper sulfate which separates out on to the iron walls, or acid fluorid of zinc which according to the present invention is used in a wooden vessel of cylindrical form and reinforced for carrying out impregnation under pressure.

In order to prevent corrosion of the trucks $g$ for carrying the wood into the cylindrical vessel $b$, the trucks $g$ are also made of materials which will not be attacked by the impregnating solution, and they are preferably made of wood. The trucks $g$ move on wheels, rollers or balls connected with the same, or they run over rolls $h$ or balls of hard wood, such as lignum-vitæ or terebinth-tree, seated in the floor portion $b^2$ of the cylinder $b$. As with this arrangement of apparatus only short pipe connections such as $c$ and $e$, are desirable, it is necessary to have the tank $a$, the impregnating cylinder $b$ and the measuring vessel $d$ close together and connect the same by means of reinforced earthenware pipes, but when they are very short they may consist of iron coated with vulcanized rubber, and they may be fitted with turning disks to serve as valves.

What I claim as my invention and desire to secure by Letters Patent is:—

1. An apparatus for impregnating wood and porous materials under pressure with metallic salts which corrode metallic vessels comprising an unlined impregnating cylinder of reinforced concrete in combination with connections and vessels for creating pressure and supplying the impregnation solution as described.

2. An apparatus for impregnating materials under pressure, consisting of a lower vessel with prepared impregnating solution of non-corrosive material, a superposed non-corrosive unlined impregnating cylinder suitably strengthened and reinforced and non-corrosive pipe-connections between said vessels, as described.

3. An apparatus for impregnating materials under pressure, consisting of a non-corrosive unlined tank, a superposed non-corrosive unlined impregnating-vessel connected by non-corrosive pipe-connections with said tank, a removable closure on one end of said upper vessel and non-corrosive trucks within said vessel, as and for the purpose described.

In testimony whereof I have hereunto signed my name this 7th day of July 1913, in the presence of two subscribing witnesses.

FRIEDRICH MOLL.

Witnesses:
    WOLDEMAR HAUPT,
    HENRY HASPER.